Feb. 3, 1931.        J. W. COX         1,790,699
                 DISTRIBUTING TANK
                 Filed Oct. 5, 1929
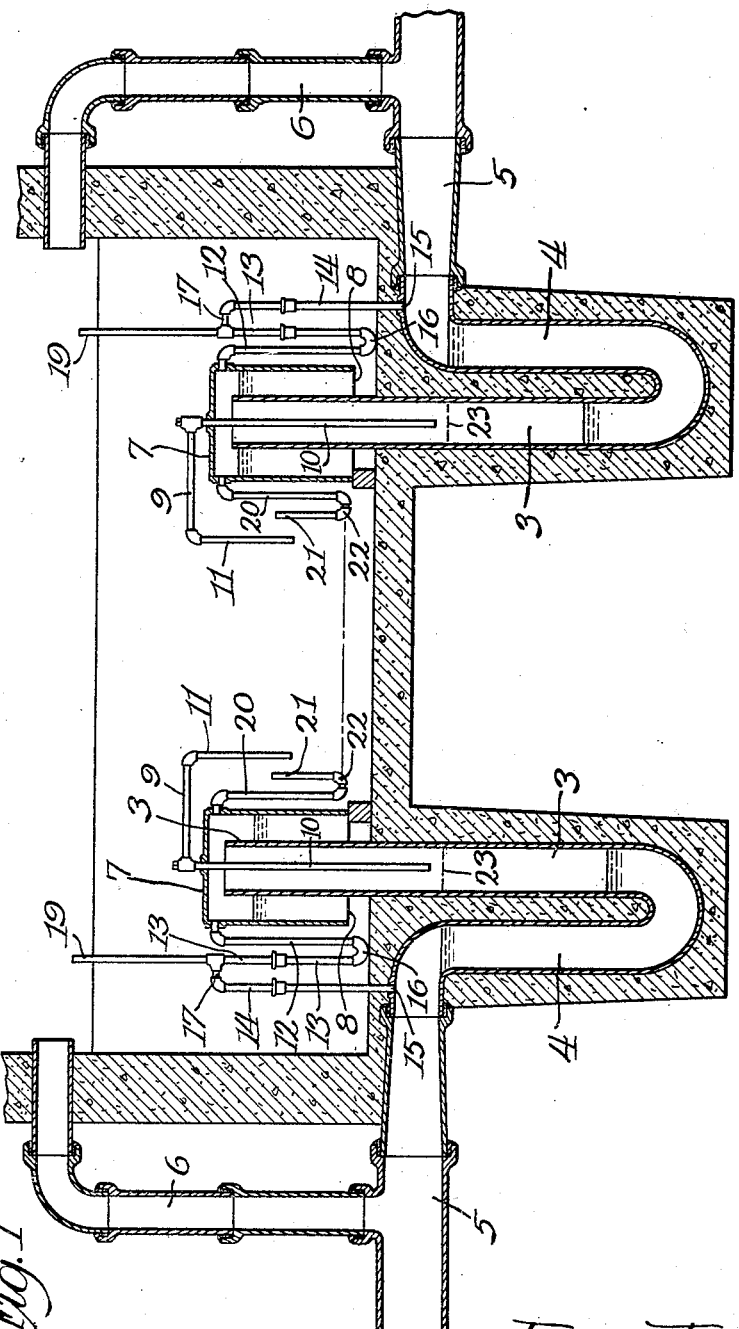
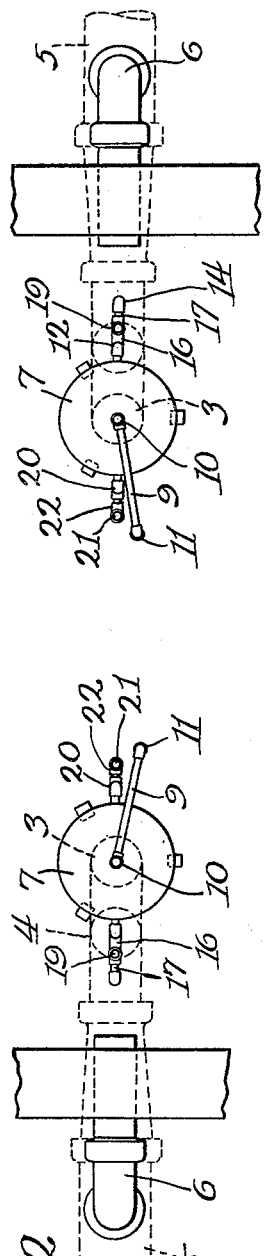
Inventor
James W. Cox
By Rector, Hibben, Davis & Macauley
Attys.

Patented Feb. 3, 1931

1,790,699

UNITED STATES PATENT OFFICE

JAMES W. COX, OF CHICAGO, ILLINOIS, ASSIGNOR TO PACIFIC FLUSH TANK COMPANY, OF CHICAGO, ILLINOIS, A CORPORATION OF ILLINOIS

DISTRIBUTING TANK

Application filed October 5, 1929. Serial No. 397,578.

My invention relates more particularly to distributing tanks, such as are used for distributing sewage liquid alternately to a pair of sewage disposal fields. Commonly a pair of alternately acting siphons, both installed in the same tank, are used for this purpose. The siphons are identical in construction and setting, insofar as ordinary workmanship can make them so, the slight variation between the two incident to manufacture and setting being, however, sufficient to star one of the siphons before the other quite reaches the operating conditions and thereafter the differences in the conditions established in a siphon which has last functioned from those in the other are sufficient to maintain the siphons in alternate operation. It sometimes happens from various causes, not necessary to mention, that this alternate action is interfered with or prevented and one of the siphons operates consecutively to the exclusion of the other. It is the object of the present invention to provide means to insure the alternate operation of the siphons.

In the drawings accompanying and forming a part of the specification,

Figure 1 shows a tank of this character provided with alternately acting siphons to which my invention is applied, in vertical section through the tank and through the two siphons, parts, however, being shown in elevation, and Fig. 2 is a plan of the siphons.

Except for the supplemental feature to which my invention relates, the construction is similar to that of established practice.

In accordance with such practice the siphons are substantially identical and unconnected to each other. It will, therefore, be sufficient to describe one of the siphons, following which I shall describe the joint operation thereof.

The main trap of the siphon, which may be of iron, is imbedded in concrete and comprises a longer leg 3 which rises a suitable distance into the tank and a shorter leg 4 which is connected to a suitable conduit 5 leading to one of the sewage disposal fields where, ordinarily, it is connected to a sprinkling system for sprinkling the sewage over the disposal beds. A vent 6 connects the conduit 5 with the distributing tank above the maximum level of the liquid in the latter. A siphon bell 7 is mounted over the open end of the longer or down-leg of the main trap, the skirt of the bell being spaced at 8 a suitable distance above the bottom of the tank. A siphon vent 9 extends through the top of the bell, the longer leg 10 of the siphon extending downwardly into the longer leg of the trap but to a point above the maximum liquid level of the trap while the shorter leg 11 of the vent extends down into the tank outside the bell. A blow-off trap for starting flow comprises an inlet leg 12 connected at its upper end to the air space of the bell, a riser leg 13, and an outlet leg 14, the latter opening at its lower end at 15 into the upper end of the short leg of the main trap. The legs of the trap are connected by bottom and top bends, 16, 17, and an air escape and filling pipe 19 extends from the upper vent to a point above the discharge line of the tank.

My invention consists in providing each of the siphons, which as thus far described are old and well known in the industry, with a trap vent 20, the longer leg of which is connected to the air space of the siphon bell, the shorter leg 21 opening upwardly into the tank above the level of the inlet end of the siphon vent, and the bend 22 of the trap vent being located at the desired low-water line of the tank.

A distributing tank provided with two siphons constructed as just described, operates as follows:

After the installation has been completed, the main trap and the blow-off trap are filled with water. The main trap is full when the water is at the level indicated by the dotted line 23 in Fig. 1. The liquid which it is desired to distribute, such as sewage liquid, may then be run in through a tap or otherwise. As the liquid rises in the tank it first seals the end of the short leg 11 of the inverted U-vent of each siphon, and then fills the trapped vents, sealing the latter. As the blow-off traps are also sealed by the water with which they were initially supplied, the air above the liquid in the bells is now sealed and the further rise of liquid in the bells about the longer legs of the main traps, which heretofore had kept pace with the level of the liquid outside the siphon, is retarded and held back. As the liquid level in the tank continues to rise, however, the liquid within the bells also rises by compressing the air above it which in turn forces down the level of the liquid in the main and blow-off traps. The displaced liquid overflows from the main and blow-off traps into the outlet conduit 5. It will be noted that the blow-off traps are of less depth than the main traps and consequently the liquid level will reach the bottom bends of the former while there remains a substantial column of liquid in the long legs of the respective main traps. When the liquid reaches the bottom bend of a blow-off trap, the air is permitted to escape from the corresponding bell. If the level of the liquid in the respective blow-off traps reached the bends thereof at identically the same instant of time, the air from the respective bells would, of course, escape simultaneously. But minor differences in workmanship and setting are sufficient to ordinarily insure the release of air from one of the siphon bells before the other siphon bell has quite attained the air release condition. When the air is released from one of the siphon bells the siphon immediately starts operating, the liquid level in the tank begins to fall and operation of the other siphon is thus prevented or postponed until the tank is again filled.

The flow of liquid through the discharging siphon refills the blow-off trap, the main body of liquid, however, after overflowing from the bell into the long leg of the main trap rising through the short leg of the main trap and flowing through the corresponding distributing conduit. The outflow of liquid continues until the level in the tank reaches the bend of the trapped vent. As the level of the liquid in the short leg 21 of the vent keeps pace with the fall of the liquid in the tank outside the vent, it ultimately reaches the bend 22 of the vent, permitting air to enter the siphon bell thus breaking the siphon flow and locking the siphon.

The conditions in the siphon which has just discharged are then the blow-off trap and the main trap are full of liquid, but the trap vent thereof is fully unsealed. The conditions in the other siphon are, however, different, a considerable proportion of the liquid which was in the main trap and in the blow-off trap having been forced out during the period when the tank was filling. Moreover, in this second siphon the trap vent is full of liquid. The seal of the last-mentioned siphon and of the blow-off trap thereof being thus weaker than the seal of the siphon which has just discharged, this condition alone would normally result in the alternate action of the siphons. But the provision of the trap-vents further insures alternate action. Since the inlet ends of the siphon vents 11 are lower than the inlet ends of the trap vents, they are sealed earlier as the water rises in the tank. The trap vent of the siphon which has just discharged being empty, this siphon is not sealed by the rising water until it reaches the entering end of the trap vent, but the second siphon is sealed as soon as the water reaches the inlet of the siphon vent since, as before mentioned, the trap vent thereof is already full of water. Therefore, compression begins earlier in the second siphon than in the siphon which has just discharged by a period of time depending upon the difference in level between the inlet ends of the trap vent and of the siphon vent, respectively. It follows, therefore, that a larger body of air is entrapped in the second siphon than in the siphon which has just discharged and this fact, coupled with the weakened seal of the second siphon to which I have referred above, ensures the alternate operation of the siphons.

The siphons will also operate alternately if the seal in the main trap is not weakened. Sometimes the main trap refills, which would stop the present used alternating siphons from operating alternately but would not effect the proper operation of two alternating siphons as this invention covers.

The main siphon traps may both here be refilled after a discharge which happens where trapless design siphons are used.

I claim:—

In a distributing tank, a pair of similar discharge siphons, each comprising a main trap and a bell thereover, a blow-off trap, a siphon vent and a trap vent connected to the air space of each bell, the inlet ends of the respective siphon vents within the tank being at a lower level than the inlet ends of the respective trap vents.

In testimony whereof, I have subscribed my name.

JAMES W. COX.